(12) United States Patent
Nemoto

(10) Patent No.: US 7,696,848 B2
(45) Date of Patent: Apr. 13, 2010

(54) BOBBINLESS COIL AND METHOD OF MANUFACTURING THE SAME

(75) Inventor: Hirotomi Nemoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 846 days.

(21) Appl. No.: 11/313,276

(22) Filed: Dec. 20, 2005

(65) Prior Publication Data

US 2006/0156536 A1 Jul. 20, 2006

(30) Foreign Application Priority Data

Jan. 17, 2005 (JP) ............................. 2005-008554

(51) Int. Cl.
*H01F 27/02* (2006.01)

(52) U.S. Cl. ...................................... 336/90

(58) Field of Classification Search ............... 336/65, 336/90–96, 205–206; 335/278
See application file for complete search history.

(56) References Cited

U.S. PATENT DOCUMENTS

| | | | |
|---|---|---|---|
| 1,893,262 A | 1/1933 | Apple | |
| 4,496,927 A | 1/1985 | Inoue | |
| 5,617,256 A * | 4/1997 | Mitsumori et al. | 359/814 |
| 6,124,775 A * | 9/2000 | Linkner, Jr. | 335/278 |
| 6,352,317 B1 * | 3/2002 | Blazic et al. | 303/119.2 |
| 7,002,444 B2 * | 2/2006 | Iwazaki et al. | 336/96 |
| 2004/0212473 A1 | 10/2004 | Iwazaki et al. | |

FOREIGN PATENT DOCUMENTS

| | | |
|---|---|---|
| DE | 199 19 396 A1 | 11/1999 |
| JP | 53-106929 | 9/1978 |
| JP | 57-003811 | 1/1982 |
| JP | 58-51502 | 3/1983 |
| JP | 58-106929 | 7/1983 |
| JP | 7220964 | 8/1995 |
| JP | 09-055328 | 2/1997 |
| JP | 10-172823 | 6/1998 |
| JP | 2003-100526 | 4/2003 |
| KR | 10 1995-0034311 | 12/1995 |
| KR | 1020000013808 A | 3/2000 |
| TW | 523155 Y | 3/2003 |
| TW | 533655 B | 5/2003 |
| WO | WO 97/33287 | 9/1997 |

* cited by examiner

*Primary Examiner*—Tuyen Nguyen
(74) *Attorney, Agent, or Firm*—Carrier, Blackman & Associates PC; Joseph P. Carrier; William D. Blackman

(57) ABSTRACT

A pair of disk-shaped guide members abut on opposite end surfaces in the axial direction of a conductor wire wound round into a coil shape by using a separable jig. The guide members are biased toward each other by engaging a part of the conductor wire with engaging portions formed at circumferences of the pair of guide members. Then, the jig is separated from the center of the conductor wire, thereby maintaining the coiled shape of the conductor wire to create a bobbinless coil having an exposed inner peripheral surface. In addition, the pair of disk-shaped guide members are biased toward each other by utilizing a part of the conductor wire, and therefore a special biasing member is not needed.

11 Claims, 7 Drawing Sheets

BOBBINLESS COIL AND METHOD OF MANUFACTURING THE SAME

RELATED APPLICATION DATA

Japanese priority application No. 2005-8554, upon which the present application is based, is hereby incorporated in its entirety herein by reference.

BACKGROUND OF THE INVENTION

1. Field of the Invention

The present invention relates to a bobbinless coil comprising a conductor wire which is wound into a coil shape and which exposes its inner peripheral surface, and a method of manufacturing the bobbinless coil.

2. Description of the Related Art

A coil used for an electromagnetic actuator or a motor is wound around an insulator which is generally called a bobbin. However, a bobbinless coil without such a bobbin is known from Japanese Patent Application Laid-open No. 10-172823. In this bobbinless coil, a tape having a bonding layer is spirally wound around a conductor wire; the conductor wire is wound into a cylindrical shape to form a coil body; a plurality of spots in a circumferential direction of the coil body are fixed to maintain the shape of the bobbinless coil.

However, the above described bobbinless coil has a problem that the shape of the coil body is likely to be inaccurate because the bobbin which becomes a guide does not exist when winding the conductor wire. Further, because the conductor wire is bonded over the entire length, there is not only a problem of requiring a large amount of tape with a bonding layer, but also a problem of requiring a large number of steps for winding the tape with the bonding layer.

SUMMARY OF THE INVENTION

The present invention is made in view of the above described circumstances, and has an object to keep a wound conductor wire of a bobbinless coil in a coil shape with a simple structure.

In order to achieve the above object, according to a first feature of the present invention there is provided a bobbinless coil comprising: a conductor wire wound into a coil shape and having an exposed inner peripheral surface; a pair of disk-shaped guide members abutting on opposite end surfaces of the coiled conductor wire in a direction of an axis thereof; and a biasing member biasing the pair of guide members toward each other.

The first and the second guide members 65 and 66 of the embodiment correspond to the guide members of the present invention.

With the arrangement of the first feature, a pair of disk-shaped guide members abut on opposite end surfaces in a direction of an axis of the coiled conductor wire, and the pair of guide members are biased by a biasing member in a direction to be close to each other. Therefore, it is possible to maintain the shape of the bobbinless coil which is wound round into the coil shape and which has an exposed inner peripheral surface.

According to a second feature of the present invention, in addition to the first feature, the biasing member is a part of the conductor engaged with engaging parts which are formed at circumferences of the pair of disk-shaped guide members.

With arrangement of the second feature, the biasing member is utilized as a part of the conductor wire, and the part of the conductor wire is engaged with engaging parts which are formed at circumferences of the pair of disk-shaped guide members, whereby the pair of guide members can be biased in the direction to be close to each other without using a special biasing member.

According to a third feature of the present invention, there is provided a method of manufacturing the bobbinless coil according to the first or second feature, comprising the steps of: winding the conductor wire into the coil shape around an outer periphery of a bobbin jig which extends centrally through the pair of disk-shaped guide members and is guided thereby; biasing the pair of guide members toward each other by engaging at least one end of the conductor wire with outer peripheral portions of the pair of guide members and pulling the one end of the conductor wire in the direction of the axis; and separating the bobbin jig from the conductor wire which is wound round into the coil shape and the pair of guide members.

With the arrangement of the third feature, the conductor wire is wound into the coil shape around an outer periphery of a bobbin jig which extends centrally through the pair of disk-shaped guide members and is guided thereby; the pair of guide members are biased toward each other by engaging at least one end of the conductor wire with outer peripheral portions of the pair of guide members and pulling the one end of the conductor wire in the direction of the axis; and then the bobbin jig is separated from the conductor wire which is wound round into the coil shape and the pair of guide members. Therefore, it is possible to manufacture a bobbinless coil which accurately maintains its coil shape without the use of tape as in the coil of Japanese Patent Application Laid-open No. 10-172823 or other bonding material. In other words, it is possible to construct the bobbinless coil of only the conductor wire and the guide members.

The above-mentioned object, other objects, characteristics, and advantages of the present invention will become apparent from an explanation of an exemplary embodiment, which will be described in detail below with reference to the attached drawings.

BRIEF DESCRIPTION OF THE DRAWINGS

FIG. 1 is a vertical sectional view of an active vibration isolation support system.

FIG. 2 is an enlarged view of Part 2 in FIG. 1.

FIG. 3 is a view showing a state in which a conductor wire is wound around a bobbin jig.

FIG. 4 is a plane view of a coil assembly.

FIG. 5 is a view taken from the direction of an arrow 5 in FIG. 4.

FIG. 6 is a sectional view taken along a line 6-6 in FIG. 4.

FIG. 7 is a flowchart explaining the operation of the system.

DESCRIPTION OF THE PRESENT EMBODIMENT

The present invention will be described based on an embodiment of the present invention shown in the attached drawings.

Embodiment 1

Figure 1:
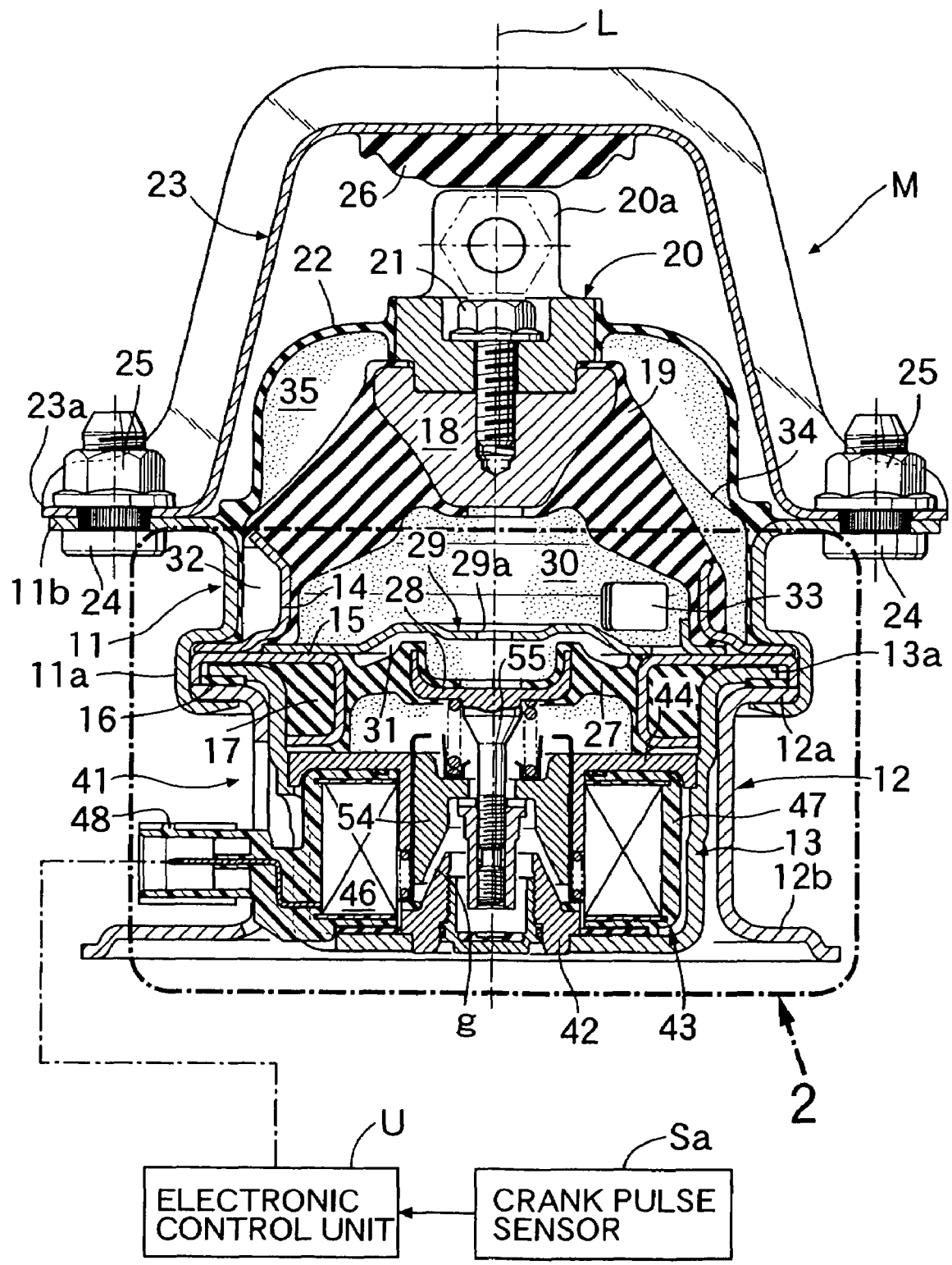
FIGS. 1 to 7 show one embodiment of the present invention.
Figure 2:
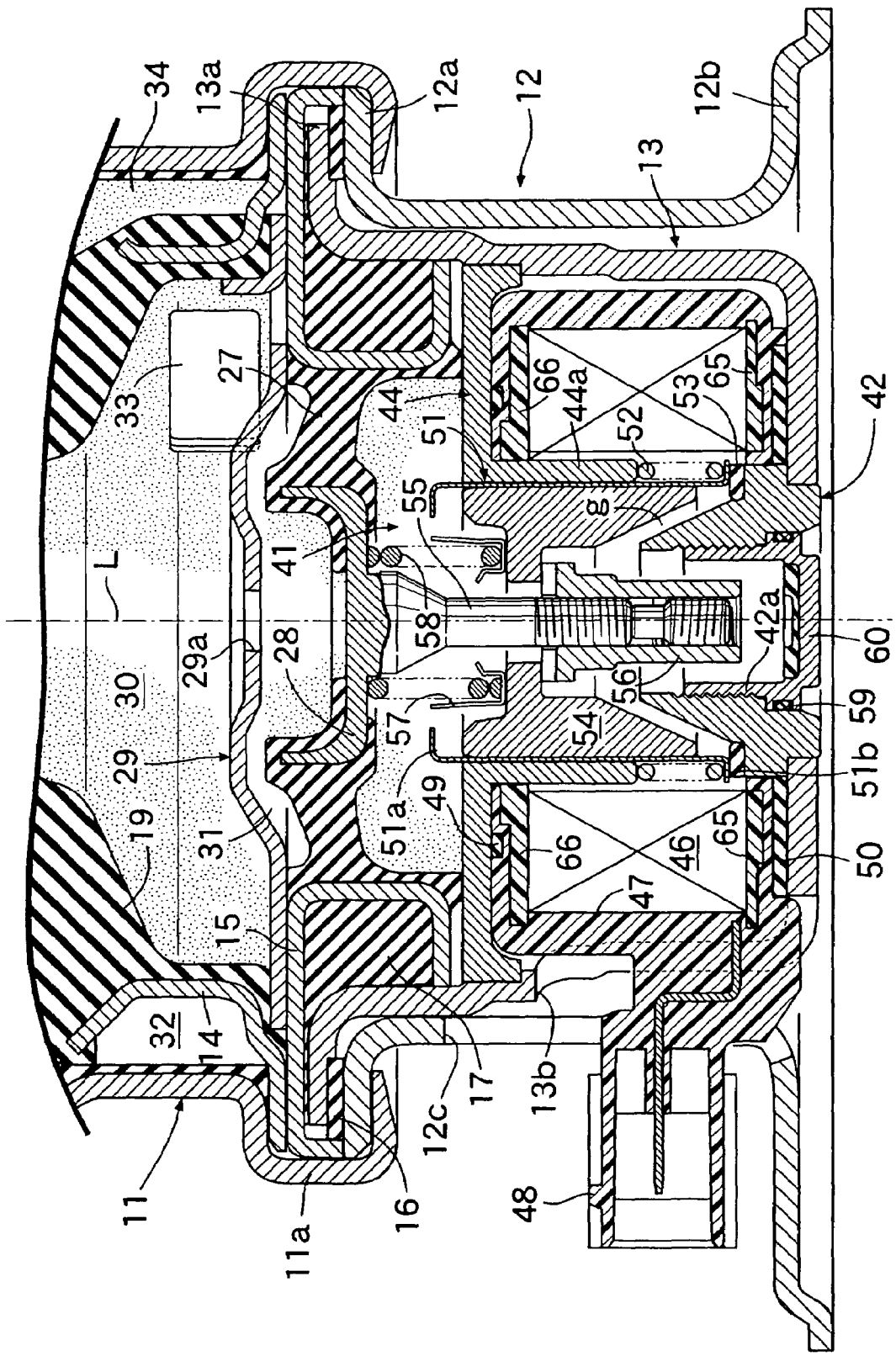

As shown in FIGS. 1 and 2, an active vibration isolation support system M (active control mount) for elastically supporting an engine of an automobile on a vehicle body frame, has a substantially symmetrical structure with respect to an axis L. Between a flange part 11a at a lower end of a substantially cylindrical upper housing 11 and a flange part 12a at an upper end of a substantially cylindrical lower housing 12, a flange part 13a at an outer periphery of a substantially cup-shaped actuator case 13 with a top open surface, an outer peripheral portion of an annular first elastic body support ring 14, and an outer peripheral portion of an annular second elastic body support ring 15 are overlaid on one another and connected by crimping. At this time, an annular first floating rubber 16 is interposed between the flange part 12a of the lower housing 12 and the flange part 13a of the actuator case 13, and an annular second floating rubber 17 is interposed between an upper portion of the actuator case 13 and an inner surface of the second elastic body support member 15, whereby the actuator case 13 is floatingly supported to be relatively movable with respect to the upper housing 11 and the lower housing 12.

A lower end and an upper end of a first elastic body 19 formed of thick rubber are respectively joined to the first elastic body support ring 14 and a first elastic body support boss 18 which is disposed on the axis L by vulcanization bonding. A diaphragm support boss 20 is fixed to a top surface of the first elastic body support boss 18 with a bolt 21, and an outer peripheral portion of a diaphragm 22 whose inner peripheral portion is joined to the diaphragm support boss 20 by vulcanization bonding is joined to the upper housing 11 by vulcanization bonding. An engine mounting part 20a which is integrally formed on a top surface of the diaphragm support boss 20 is fixed to an engine not shown. A vehicle body mounting part 12b at a lower end of the lower housing 12 is fixed to a vehicle body frame not shown.

A flange part 23a at a lower end of a stopper member 23 is connected to a flange part 11b at an upper end of the upper housing 11 with bolts 24 and nuts 25. The engine mounting part 20a projectingly provided on the top surface of the diaphragm support boss 20 faces a stop rubber 26 which is mounted to an inner surface of an upper portion of the stopper member 23 so that the engine mounting part 20a can abut on the stop rubber 26. When a large load is inputted into the active vibration isolation support system M, the engine mounting part 20a abuts on the stopper rubber 26, whereby excessive displacement of the engine is suppressed.

An outer peripheral portion of a second elastic body 27 formed of rubber in a film form is joined to the second elastic body support ring 15 by vulcanization bonding. A movable member 28 is joined to a central portion of the second elastic body 27 by vulcanization bonding so as to be embedded in the central portion. A disk-shaped partition wall member 29 is fixed between the top surface of the second elastic body support ring 15 and an outer peripheral portion of the first elastic body 19. A first liquid chamber 30 defined by the partition wall member 29 and the first elastic body 19 as well as a second liquid chamber 31 defined by the partition wall member 29 and the second elastic body 27 communicate with each other via a communication hole 29a formed in a central portion of the partition wall member 29.

An annular communication passage 32 is formed between the first elastic body support ring 14 and the upper housing 11. One end of the communication passage 32 communicates with the first liquid chamber 30 via a communication hole 33, and the other end of the communication passage 32 communicates with a third liquid chamber 35 which is defined by the first elastic body 19 and the diaphragm 22 via a communication hole 34.

Next, the structure of an actuator 41 for driving the movable member 28 will be described.

A fixed core 42, a coil assembly 43 and a yoke 44 are mounted inside the actuator case 13 sequentially from the lower side to the upper side. The coil assembly 43 comprises a bobbinless coil 46 disposed between the fixed core 42 and the yoke 44, and a coil cover 47 which covers an outer periphery of the bobbinless coil 46. A connector 48 is integrally formed at the coil cover 47 so as to penetrate through openings 13b and 12c formed in the actuator case 13 and the lower housing 12 and extend to the outside.

Here, a method of manufacturing the coil assembly 43 will be described.

Figure 3:
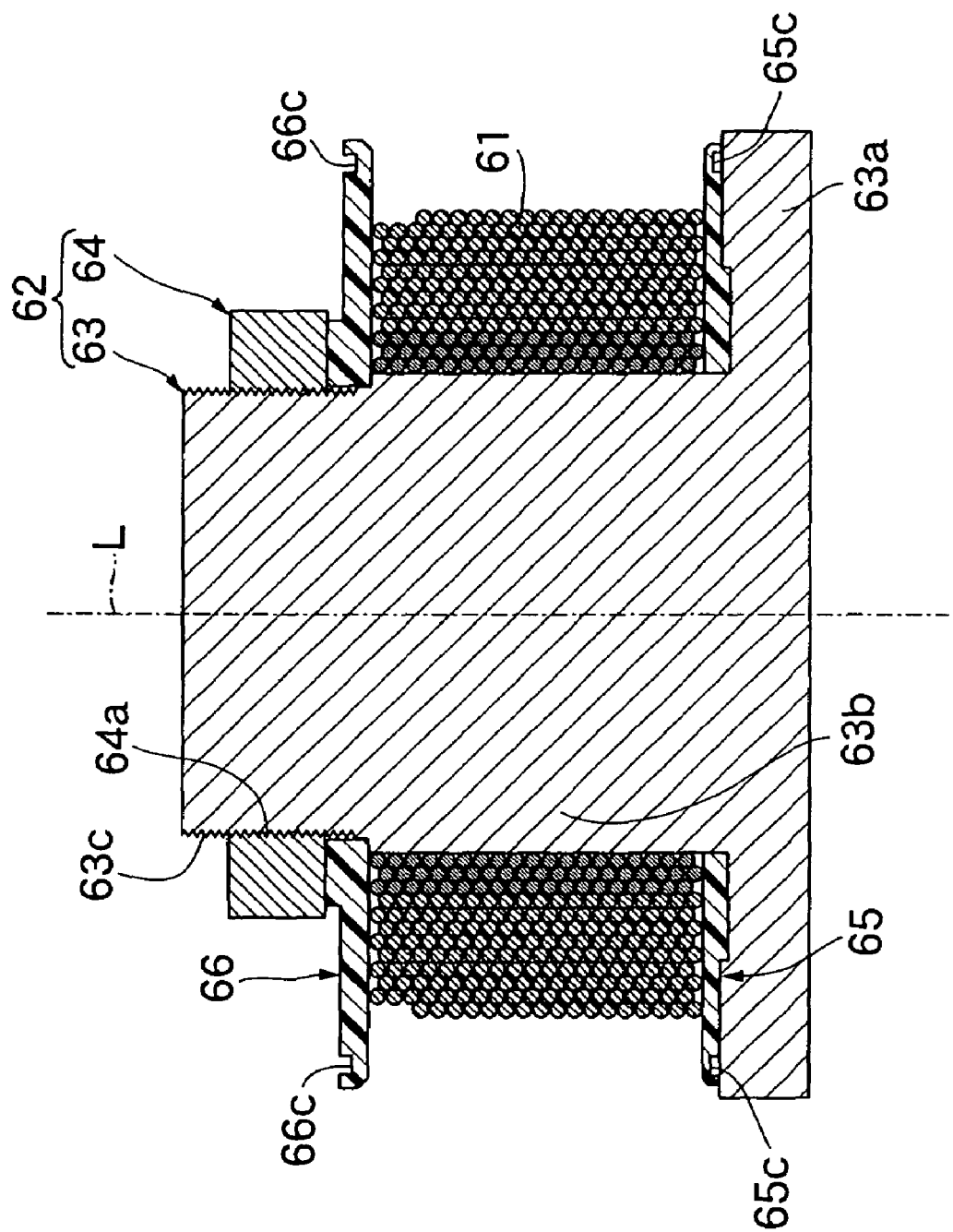

As shown in FIG. 3, a bobbin jig 62 for winding a conductor wire 61 into a coil shape comprises a jig body 63 and a holding member 64. The jig body 63 includes a disk-shaped flange part 63a and a columnar winding part 63b, and a female screw 64a of the holding member 64 is screwed onto a male screw 63c provided at a tip end of the winding part 63b. A first guide member 65 of a synthetic resin is fitted on the flange part 63a of the jig body 63, and comprises a disk-shaped plate which is perpendicular to the axis L. A second guide member 66 of a synthetic resin also comprises a disk-shaped plate which is perpendicular to the axis L the same as the first guide member 65. The second guide member 66 is positioned by the holding member 64 with the female screw 64a screwed onto the male screw 63c of the jig body 63 in a state in which the second guide member 66 is fitted to a step portion provided at an outer periphery of the winding part 63b of the jig body 63.

As described above, in the state in which the first and second guide members 65 and 66 are held at the bobbin jig 62, the conductor wire 61 is wound using, as the guide, the outer peripheral surface of the winding part 63b of the jig body 63 as well as opposed surfaces between the first and second guide members 65 and 66.

Figure 4:
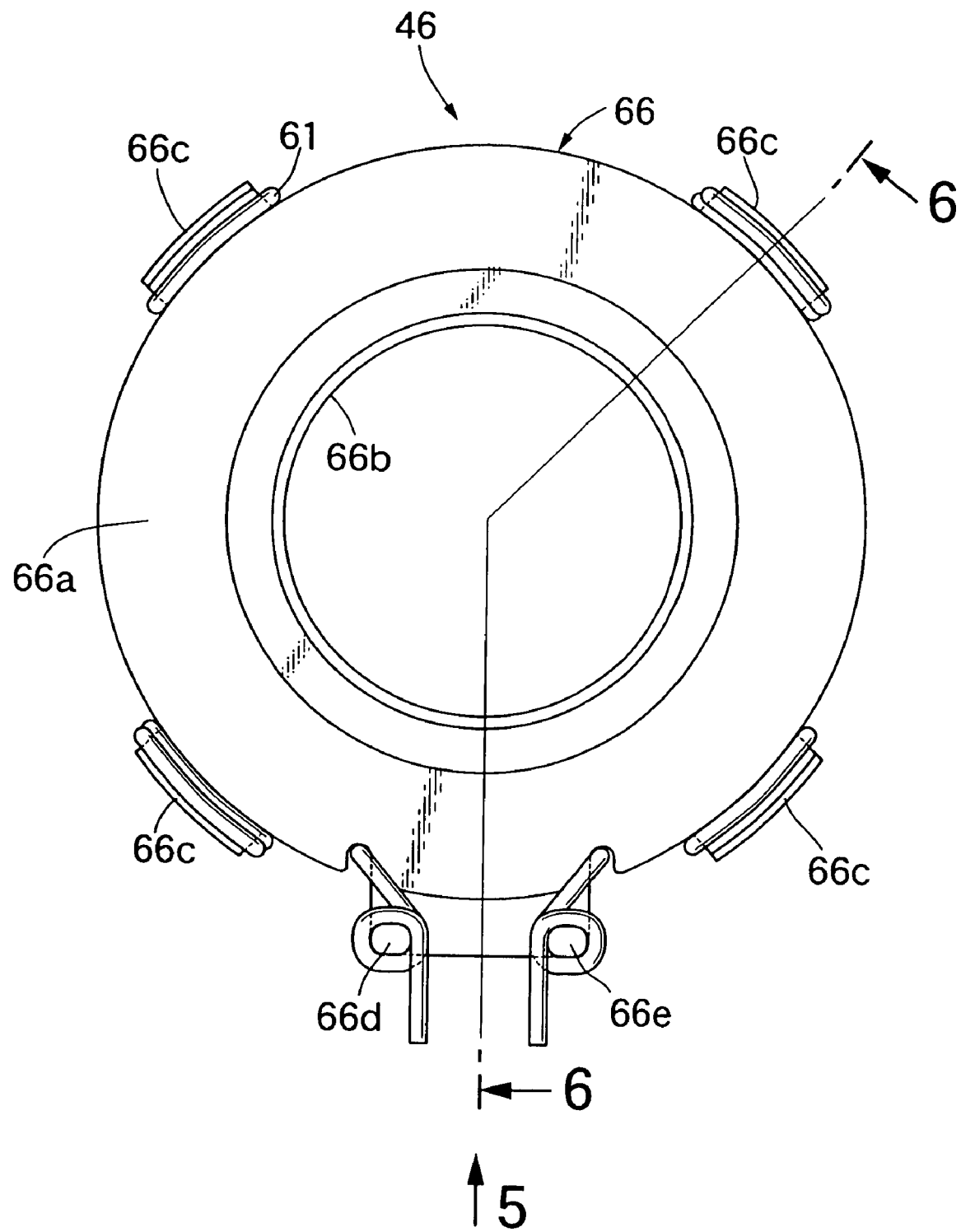
Figure 5:
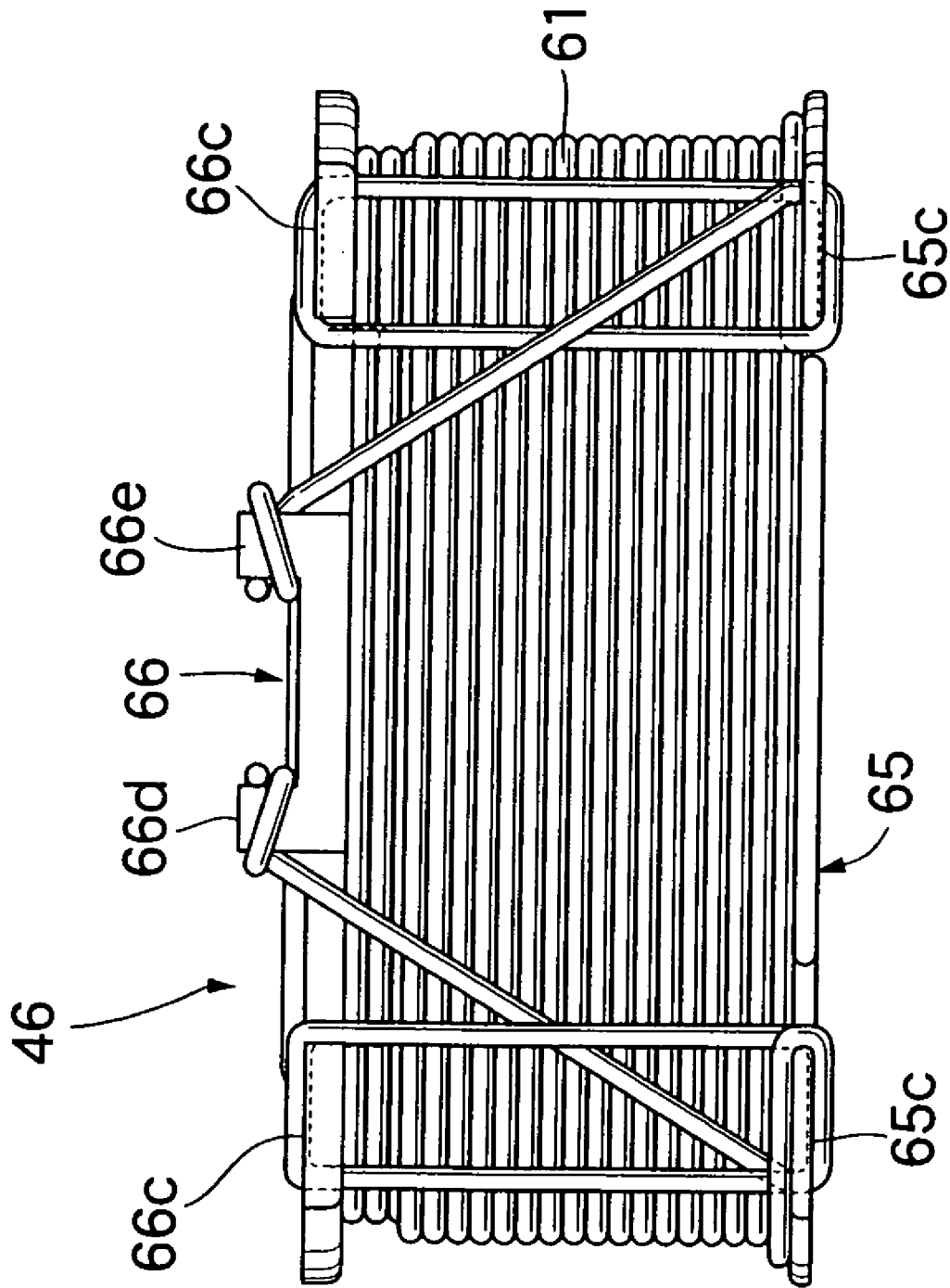
Figure 6:
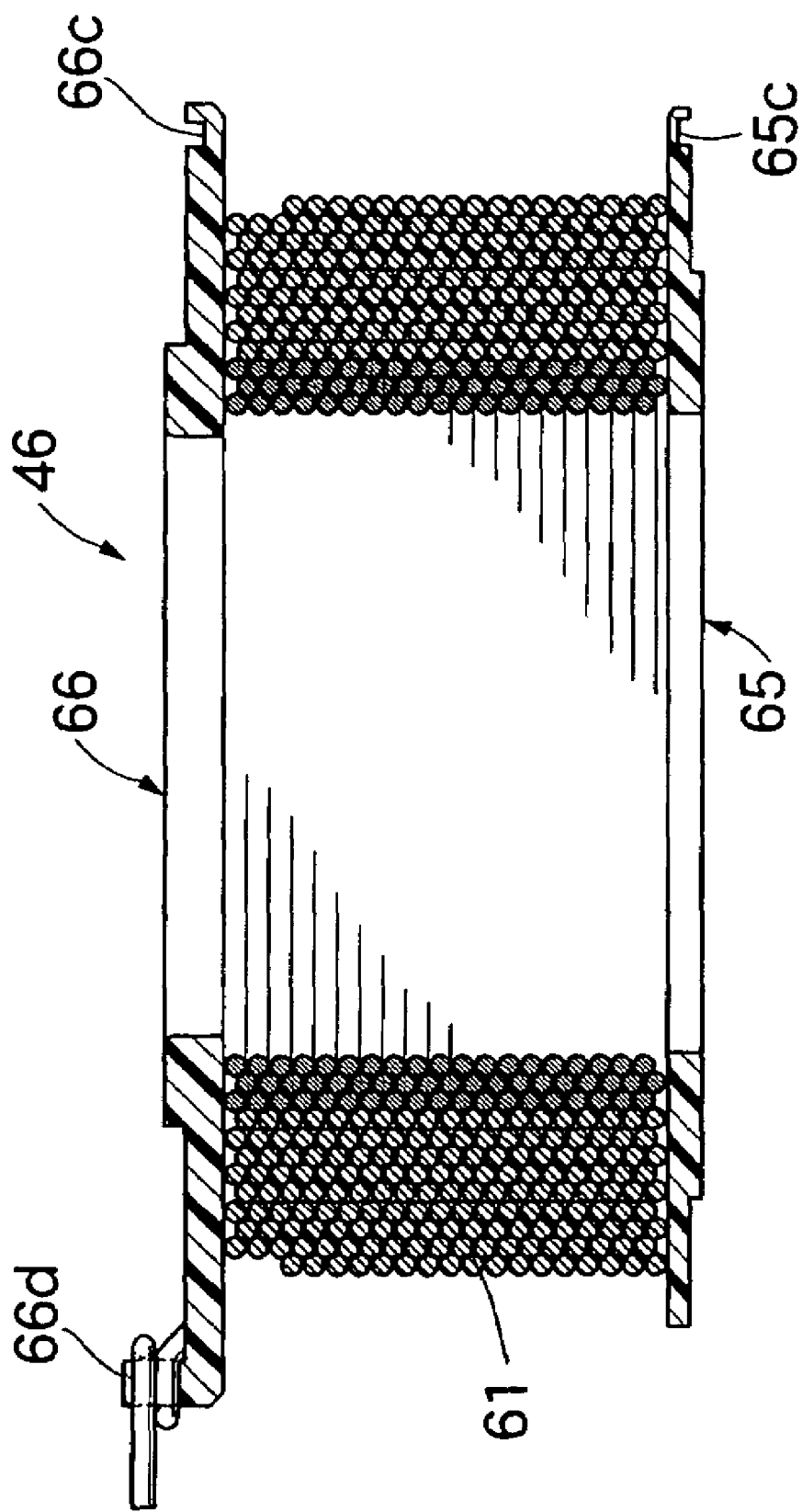

As is obvious from FIGS. 4 to 6, four engaging parts 65c are formed at 90° intervals at an outer peripheral portion of the first guide member 65. Four engaging parts 66c are formed at 90° intervals at an outer peripheral portion of the second guide member 66, and between two engaging parts 66c and 66c among them, a start end projection 66d and a terminal end projection 66e are formed. A start end (winding start side) of the conductor wire 61 is first wound around the start end projection 66d of the second guide member 66, from which the conductor wire 61 is guided radially inward to the winding part 63b to be wound around the winding part 63b.

A terminal end of the conductor wire 61 is wound into a coil shape from radially inside to outside using the winding part 63b and the first and the second guide members 65 and 66 as the guide, and is wound in a circumferential direction to be alternately engaged with the four engaging parts 65c of the first guide member 65 and the four engaging parts 66c of the second guide member 66. By giving a predetermined tensile force to the conductor wire 61 in this process, the first and second guide members 65 and 66 are biased in the direction to be close to each other. Thus, a part of the conductor wire engaged with and connected to the engaging parts 65c, 66c with the predetermined tensile force functions as a biasing member for the bobbinless coil. The terminal end (winding end) of the conductor wire 61 is wound around the terminal end projection 66e of the second guide member 66.

A load acting on an inner diameter portion of the conductor wire 61 which is wound into the coil shape is determined by a diameter of the winding part 63b around which the conductor wire 61 is wound, a wire diameter of the conductor wire 61, the number of windings and the winding tensile force of the conductor wire 61. For example, in the case where the conductor wire 61 is wound with the same winding tensile force, the load acting on the inner diameter portion becomes larger as the number of windings becomes larger, and a plastic deformation zone of the conductor wire 61 becomes large. Accordingly, the plastic deformation zone of the conductor wire 61 can be controlled by adjusting the diameter of the winding part 63b around which the conductor wire 61 is wound, the wire diameter of the conductor wire 61, and the number of windings and the winding tensile force of the conductor wire 61.

However, because the diameter of the winding part 63b, the wire diameter of the conductor wire 61, and the number of windings of the conductor wire 61 affect the performance of the bobbinless coil 46, in this embodiment, the conductor wire 61 at that portion is plastically deformed by enhancing the winding tensile force of three layers of conductor wire 61 which is densely shown in FIG. 3, to thereby enhance the holding function of the coil shape.

When the coil shape of the wound conductor wire 61 is maintained in this manner, the holding member 64 is separated from the jig body 63, and the jig body 63 is extracted from the inner peripheral surface of the conductor wire 61. The synthetic resin coil cover 47 is molded on the outer peripheral surface excluding the inner peripheral surface of the coil-shaped conductor wire 61, and on outer surfaces of the first and the second guide members 65 and 66, to thereby complete the coil assembly 43. When the coil cover 47 is molded, the connector 48 is integrally formed therein.

Returning to FIGS. 1 and 2, a seal member 49 is disposed between the top surface of the coil cover 47 and the undersurface of the yoke 44, and a seal member 50 is disposed between the undersurface of the bobbinless coil 46 and the top surface of the fixed core 42. These seal members 49 and 50 prevent water and dust from entering an inner space of the actuator 41 from the openings 13b and 12c formed in the actuator case 13 and the lower housing 12.

A bearing member 51 having a thin-walled cylindrical shape is vertically slidably fitted to an inner peripheral surface of a cylindrical part 44a of the yoke 44. An upper flange 51a folded radially inward is formed at an upper end of the bearing member 51, and a lower flange 51b folded radially outward is formed at a lower end. A set spring 52 is disposed under compression between the lower flange 51b and a lower end of the cylindrical part 44a of the yoke 44. The lower flange 51b is pressed by a resilient force of the set spring 52 against a top surface of the fixed core 42 via an elastic body 53, so that the bearing member 51 is supported by the yoke 44.

A substantially cylindrical movable core 54 is vertically slidably fitted onto an inner peripheral surface of the bearing member 51. A rod 55 extending downward from a center of the movable member 28 loosely penetrates through a center of the movable core 54, and a nut 56 is fastened to a lower end of the rod 55. A set spring 58 is disposed under compression between a spring seat 57 provided on a top surface of the movable core 54 and an undersurface of the movable member 28, and the movable core 54 is pressed by a resilient force of the set spring 58 against the nut 56 to be fixed. In this state, an undersurface of the movable core 54 and the top surface of the fixed core 42 are opposed to each other with a conical air gap g therebetween. The rod 55 and the nut 56 are loosely fitted in an opening 42a formed in a center of the fixed core 42, and the opening 42a is closed by a plug 60 via a seal member 59.

An electronic control unit U, to which a crank pulse sensor Sa for detecting a crank pulse outputted with rotation of a crankshaft of an engine is connected, controls energization to the actuator 41 of the active vibration isolation support system M. The crank pulses of the engine are outputted 24 times per rotation of the crankshaft, namely, one crank pulse is outputted at each 15° of the crank angle.

Next, the operation of the embodiment of the present invention with the above described structure will be described.

When engine shake vibration at low frequency occurs during traveling of an automobile, and the first elastic body 19 is deformed by the load inputted from the engine via the diaphragm support boss 20 and the first elastic body support boss 18, the capacity of the first liquid chamber 30 changes, so that liquid comes and goes between the first liquid chamber 30 and the third liquid chamber 35 which are connected via the communication passage 32. When the capacity of the first liquid chamber 30 increases/decreases, correspondingly the capacity of the third liquid chamber 35 decreases/increases, but the capacity change of the third liquid chamber 35 is absorbed by the elastic deformation of the diaphragm 22. In this case, the shape and size of the communication passage 32 and the spring constant of the first elastic body 19 are set to exhibit a low spring constant and a high damping force in the frequency region of the engine shape vibration, thereby effectively reducing the vibration transmitted from the engine to the vehicle frame.

The actuator 41 is kept in the non-operational state in the frequency region of the engine shake vibration.

When vibration at a frequency higher than that of the engine shake vibration, namely, vibration during idling due to rotation of the crankshaft of the engine, or vibration when traveling with cylinders in a cut-off state is generated, the liquid inside the communication passage 32 which connects the first liquid chamber 30 and the third liquid chamber 35 enters a stuck state, and cannot exhibit a vibration isolating function, and therefore the actuator 41 is driven to exhibit the vibration isolating function.

The electronic control unit U controls energization to the bobbinless coil 46 based on the signal from the crank pulse sensor Sa in order to exhibit the vibration isolating function by operating the actuator 41 of the active vibration isolation support system M.

Figure 7:
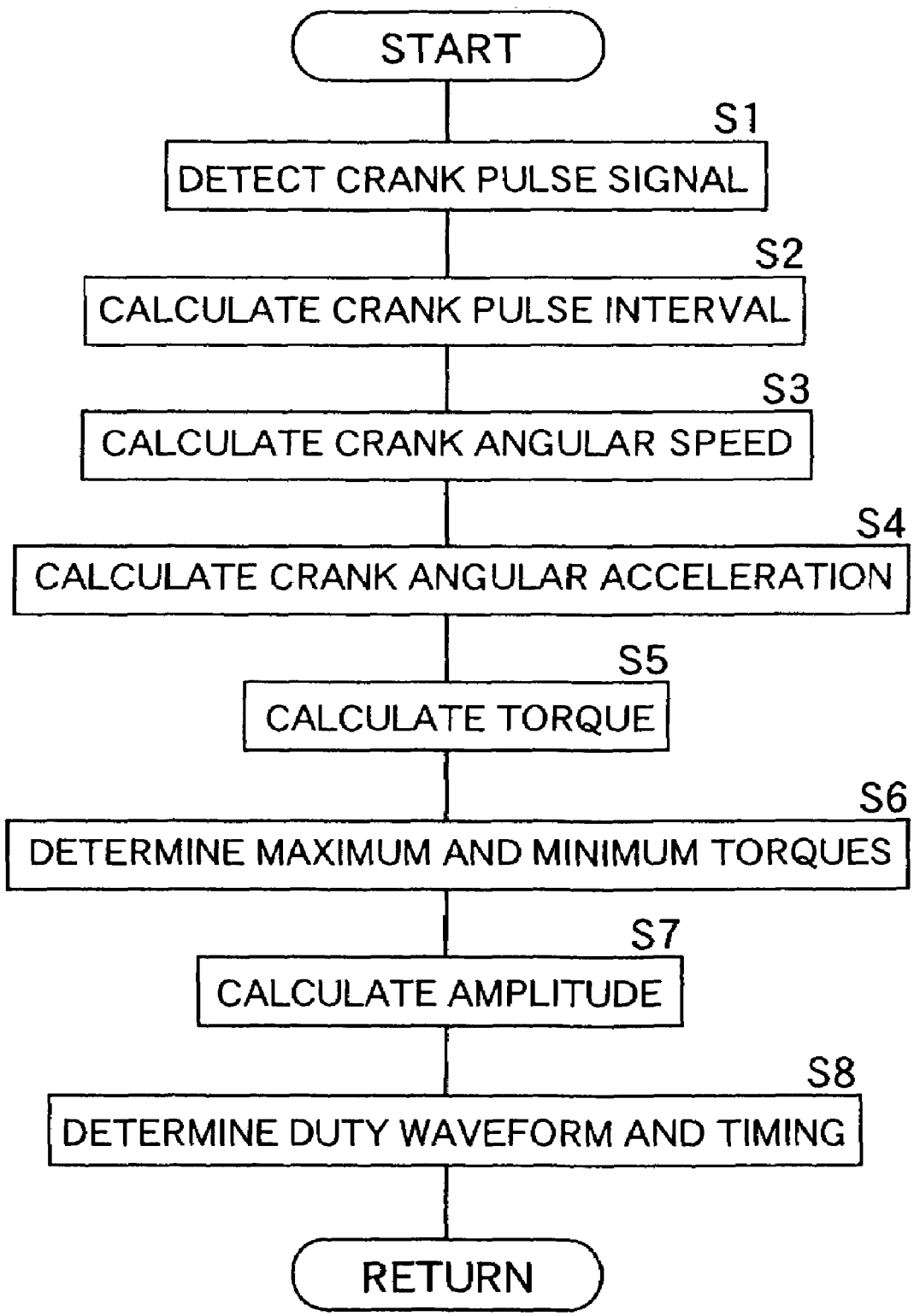

Namely, in the flowchart in FIG. 7, the electronic control unit U first reads the crank pulse which is outputted every 15° of the crank angle from the crank pulse sensor Sa in Step S1, and calculates the time interval of the crank pulses by comparing the read crank pulse with crank pulse which is the reference (TDC signal of a specific cylinder) in Step S2. In Step S3, the electronic control unit U calculates a crank angular speed $\omega$ by dividing the crank angle of 15° by the time interval of the crank pulses. In Step S4, the electronic control unit U calculates a crank angular acceleration $d\omega/dt$ by differentiating the crank angular speed $\omega$ with time. In Step S5, the electronic control unit U calculates torque Tq about the crankshaft of the engine according to $$Tq = I \times d\omega/dt$$

where moment of inertia about the crankshaft of the engine is I. The torque Tq is 0 when it is assumed that the crankshaft rotates at a constant angular speed $\omega$, but in the expansion stroke, the angular speed $\omega$ increases due to acceleration of the piston, and in the compression stroke, the angular speed $\omega$ decreases due to deceleration of the piston to cause the crank angular acceleration $d\omega/dt$. Therefore, the torque Tq proportional to the crank angular acceleration $d\omega/dt$ occurs.

In Step S6, the electronic control unit U determines the maximum value and the minimum value of the torques adjacent timewise. In Step S7, the electronic control unit U calculates a difference between the maximum value and the minimum value of torque, namely, an amplitude at the position of the active vibration isolation support system M which supports the engine. In step S8, the electronic control unit U determines a duty waveform and timing (phase) of an electric current which is applied to the bobbinless coil 46 of the actuator 41.

Thus, when the engine moves downward with respect to the vehicle body frame and the first elastic body 19 deforms downward to decrease the capacity of the first liquid chamber 30, the bobbinless coil 46 of the actuator 41 is excited in this timing, so that the movable core 54 moves downward toward the fixed core 42 by the attraction force generated in the air gap g and the second elastic body 27 deforms downward by being pulled by the movable member 28 connected to the movable core 54 via the rod 55. As a result, the capacity of the second liquid chamber 31 increases, and therefore the liquid in the first liquid chamber 30, which is compressed by the load from the engine, passes through the communication hole 29a of the partition wall member 29 and flows into the second liquid chamber 31, thus reducing the load transmitted from the engine to the vehicle body frame.

When the engine subsequently moves upward with respect to the vehicle body frame, and the first elastic body 19 deforms upward to increase the capacity of the first liquid chamber 30, the bobbinless coil 46 of the actuator 41 is demagnetized in this timing, so that the attraction force generated in the air gap g disappears and the movable core 54 can freely move. Therefore, the second elastic body 27 which has been deformed downward restores upward with its own elastic restoring force. As a result, the capacity of the second liquid chamber 31 decreases, and therefore, the liquid in the second liquid chamber 31 passes through the communication hole 29a of the partition wall member 29 and flows into the first liquid chamber 30, thus allowing the engine to move upward with respect to the vehicle body frame.

By magnetizing and demagnetizing the bobbinless coil 46 of the actuator 41 in accordance with the vibration cycle of the engine as described above, it is possible to generate an active vibration control force which prevents the vibration of the engine from being transmitted to the vehicle body frame.

Thus, the first and the second guide members 65 and 66 are caused to abut on opposite end surfaces in the direction of the axis L of the conductor wire 61 wound round into the coil shape, and the pair of guide members 65 and 66 are biased in the direction to be close to each other by utilizing the conductor wire 61. Therefore, it is possible to reliably maintain the shape of the bobbinless coil 46 having the conductor wire 61 which is wound round into the coil shape and which exposes its inner peripheral surface, and eliminate the need of the special biasing member to reduce the number of the components. Further, it is possible to prevent loosening of the conductor wire 61, while reducing the number of components and the cost by removing the bobbin and the tape having a bonding layer from the bobbinless coil 46. Furthermore, it is possible to reduce the inner diameter of the bobbinless coil 46 corresponding to the amount of the bobbin, thus reducing the resistance and inductance to enhance electric current responsiveness.

The exemplary embodiment of the present invention has been described above, but various changes in design can be made without departing from the subject matter of the present invention.

For example, the bobbinless coil 46 of the active vibration isolation support system M is shown as an example of the embodiment, but the bobbinless coil of the present invention is applicable to any other use and purpose.

Also, in the exemplary embodiment, the first and the second guide members 65 and 66, which are disposed at opposite ends in the axis L direction of the conductor wire 61 wound round into the coil shape, are biased by the conductor wire 61 itself, but they can be biased by using any biasing member (a wire or a spring) instead of the conductor wire 61.

In the exemplary embodiment, the first and second guide members 65 and 66 are biased at one end of the conductor wire 61, but they may be biased at opposite ends of the conductor wire 61.

The method of winding the conductor wire 61 for biasing the first and second guide members 65 and 66 in the direction to be close to each other is optional.

What is claimed is:

1. A bobbinless coil comprising:
   a conductor wire wound into a coil shape and having an exposed inner peripheral surface;
   a pair of disk-shaped guide members abutting on opposite end surfaces of the coiled conductor wire in a direction of an axis L thereof; and a biasing member biasing the pair of guide members toward each other;
   wherein the biasing member is a part of the conductor wire engaged with engaging parts which are formed at circumferences of the pair of disk-shaped guide members, thereby connecting the disk-shaped guide members to the conductor wire wound into the coil shape.

2. The bobbinless coil according to claim 1, wherein the part of the conductor wire is pulled in an axial direction of the coil when it is engaged with the engaging parts so that the part of the conductor wire remains engaged with the engaging parts under a predetermined tensile force.

3. The bobbinless coil according to claim 1, wherein the part of the conductor wire is an end part.

4. The bobbinless coil according to claim 1, wherein the part of the conductor wire is a terminal end part.

5. A bobbinless coil comprising:
   a conductor wire wound into a coil shape and having an exposed inner peripheral surface;
   a pair of disk-shaped guide members abutting on opposite end surfaces of the coiled conductor wire in a direction of an axis L thereof; and a biasing member biasing the pair of guide members toward each other;
   wherein start and terminal end projections are provided with the guide members, and start and terminal ends of the conductor wire are engaged with the start and terminal end projections, respectively.

6. The bobbinless coil according to claim 1, wherein the disk-shaped guide members are planar, and the engaging parts of the guide members are disposed radially outwardly of the conductor wire wound into the coil shape.

7. The bobbinless coil according to claim 1, wherein each of the disk-shaped guide members includes at least two of said engaging parts spaced from each other at the circumference of the guide member.

8. A bobbinless coil comprising:
   a conductor wire wound into a coil shape and having an exposed inner peripheral surface;
   a pair of disk-shaped guide members abutting on opposite end surfaces of the coiled conductor wire in a direction of an axis L thereof; and a biasing member biasing the pair of guide members toward each other;
   wherein start and terminal ends of the conductor wire are connected to at least one of the disk-shaped guide members.

9. A bobbinless coil comprising:
   a conductor wire wound into a coil shape and having an exposed inner peripheral surface;
   a pair of disk-shaped guide members abutting on opposite end surfaces of the coiled conductor wire in a direction of an axis L thereof; and a biasing member biasing the pair of guide members toward each other;

wherein said coil shape includes multiple layers of the conductor wire wound in a radial direction of the coil shape, with a radially innermost one of said layers forming said exposed inner peripheral surface of the coil shape, and said biasing member being disposed outwardly of a radially outermost one of said layers.

10. A bobbinless coil comprising:

a conductor wire wound into a coil shape and having an exposed inner peripheral surface;

a pair of disk-shaped guide members abutting on opposite end surfaces of the coiled conductor wire in a direction of an axis L thereof; and a biasing member biasing the pair of guide members toward each other;

wherein some of said multiple layers of the conductor wire closest to said exposed inner peripheral surface of the coil shape are wound with a greater winding tensile force than others of said multiple layers.

11. A bobbinless coil consisting of:

a conductor wire wound into a coil shape and having an exposed inner peripheral surface;

a pair of disk-shaped guide members abutting on opposite end surfaces of the coiled conductor wire in a direction of an axis L thereof; and a biasing member biasing the pair of guide members toward each other.

\* \* \* \* \*